Figure 1:
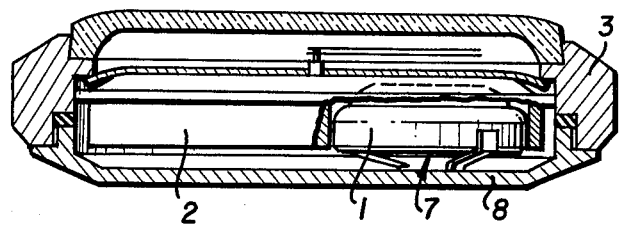

United States Patent [19]

Perrot

[11] 4,362,396
[45] Dec. 7, 1982

[54] BATTERY HOLDER FOR ELECTRONIC WRIST WATCH

[75] Inventor: Friedrich Perrot, Lengnau, Switzerland

[73] Assignee: ETA A.G. Ebauches-Fabrik, Soleure, Switzerland

[21] Appl. No.: 174,798

[22] Filed: Aug. 4, 1980

[30] Foreign Application Priority Data

Aug. 21, 1979 [CH] Switzerland ............... 7629/79

[51] Int. Cl.³ .................................. B32B 00/00
[52] U.S. Cl. ................................ 368/203; 368/88
[58] Field of Search .............. 368/88, 204, 203, 82, 368/276; 428/96, 98; 339/152, 17 C, 75 R, 75 M

[56] References Cited

U.S. PATENT DOCUMENTS

| | | |
|---|---|---|
| 3,992,870 | 11/1976 | Dekel . |
| 4,051,665 | 10/1977 | Arn ............................ 200/52 R |
| 4,065,710 | 12/1977 | Zytka ......................... 339/152 |
| 4,068,464 | 1/1978 | Barnett et al. . |
| 4,073,132 | 2/1978 | Fohlich ....................... 368/204 |
| 4,107,400 | 8/1978 | Grohoski ..................... 429/98 |
| 4,232,512 | 11/1980 | Yoshikawa ................... 368/82 |
| 4,251,604 | 2/1981 | Umemoto ..................... 368/204 |

FOREIGN PATENT DOCUMENTS

| | | |
|---|---|---|
| 2315775 | 1/1977 | France ......................... 429/98 |
| 2361687 | 10/1978 | France . |
| 1468243 | 3/1977 | United Kingdom . |

Primary Examiner—Bernard Roskoski
Attorney, Agent, or Firm—Stevens, Davis, Miller & Mosher

[57] ABSTRACT

A battery is placed in a recess in the plate of an electronic wrist watch movement. The battery cover presses against a spring contact fixed to a plate bearing a printed circuit. An insulating sheet insulates the battery from an inner flange of the movement plate. Disposed on the bottom of the battery casing is a pressure bracket having arms which resiliently grip the sidewall of the casing. Resilient radial tongues of the bracket are bent so as to be in contact with the back of the watch case which presses against the assembly at the time of casing-up so as to hold the battery in place. The connection to ground is established by a contact part and a screw, as well as by the contact between the battery casing and the movement plate and via the back of the watch case.

8 Claims, 10 Drawing Figures

BATTERY HOLDER FOR ELECTRONIC WRIST WATCH

This invention relates in general to electronic wrist watches, and in particular to battery holders for such watches, of the type having a cylindrical recess for accommodating the battery, situated within the watch movement and opening out toward the back of the watch case, and gripping means for positioning and securing the battery within the recess by radial pressure.

Until now, there has been no satisfactory solution to the problem of securing the battery or batteries in electronic wrist watches. A large number of prior art devices hold the battery and establish contact solely by means of resilient elements. As compared with other arrangements utilizing clips fixed to the watch movement by screws, such devices have the advantage of avoiding certain operations which are difficult to perform automatically at the time of fitting and casing up the movements.

The prior art devices which utilize only resilient means are themselves divided into two categories. One category, in which the devices disclosed in U.S. Pat. Nos. 4,068,464, 4,051,665, and 3,992,870 may be said to belong, makes use of resilient conductive plates situated behind the watch movement, i.e., between the battery or batteries and the back of the watch case, and resiliently fixed to the frame of the movement. These plates hold the battery or batteries axially and provide the connection of one of the poles to the circuit of the watch. A drawback of such arrangements is that the plates must be fitted both to the movement and to the batteries. Thus, it is necessary to program the manufacture of different elements for the different calibers contemplated and, within the limits of each caliber, for the different types of batteries which can be used with that caliber, since it is customary to deliver certain calibers with relatively thick long-life batteries or with thin batteries for producing very flat watches. These prior art devices therefore complicate manufacture. Moreover, when thin watches are supposed to be produced, the presence of such devices constitutes an obstacle to the desired result.

In the second category of prior art devices, the active resilient elements press laterally against the battery or batteries. One example of such a device is disclosed in U.K. Pat. No. 1,468,243. With this kind of design, batteries of various thicknesses can be accommodated in any one movement. However, it has been found that in the event of axial shock, the battery can become displaced, so that contact with the pole situated at the top of the battery may be broken, or at least become faulty.

In other devices of the same kind, additional means have been provided for preventing axial displacement of the battery in the event of shock. According to U.S. Pat. No. 4,107,400, in which the connection between the battery and the circuit is established by spring contacts, one extending over the top of the battery and the other resting on the upper edge of the battery sidewall, the battery is inserted in a matching hole in the back of the watch case and is held in place by means of a removable hatch cover fixed against the back. In this case, any possibility of varying the axial thickness of the battery is precluded. Moreover, this design entails practical difficulties in ensuring fluid-tightness.

French Published Application No. 2,361,687 proposes holding the batteries in place axially by using a system known per se for appliances such as electric shavers, wherein foam rubber disks are inserted between the batteries and the back of the watch case. However, this solution cannot be applied to high-quality watches, firstly, because of the difficulty in exactly positioning elements such as those described in the French application, secondly, because of the drawbacks connected with ageing of the specified material as well as its hygroscopic properties, and finally, because reliable use of this known means is prevented by the necessity of compensating for manufacturing tolerances in the thickness of the batteries or differences in thickness of 0.5 mm corresponding to the difference between a long-life battery and a thin one.

It is an object of this invention to provide a simple, improved battery holder requiring only a minimum number of parts and simplifying inventories, the supply of spare parts for servicing, and manufacturing controls.

To this end, in the battery holder for electronic watches according to the present invention, the improvement comprises an axial-pressure bracket disposed between the battery and the back of the watch case, resiliently pressing against the latter, and fitted to the battery.

Thus, the invention proposes supplementing the positioning and securing means acting radially upon the battery by adding a further element which may be utilized or dispensed with, according to the particular circumstances of manufacture, and which fits the battery itself. This element, the aforementioned axial-pressure bracket, can be mass-produced depending solely on the types of batteries used. A single element can be used with different watch calibers inasmuch as it is not in contact with the movement.

Figure 2:
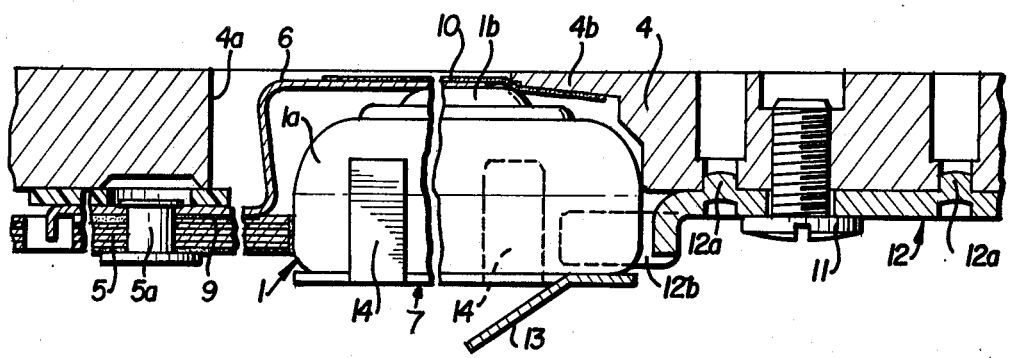
Figure 3:
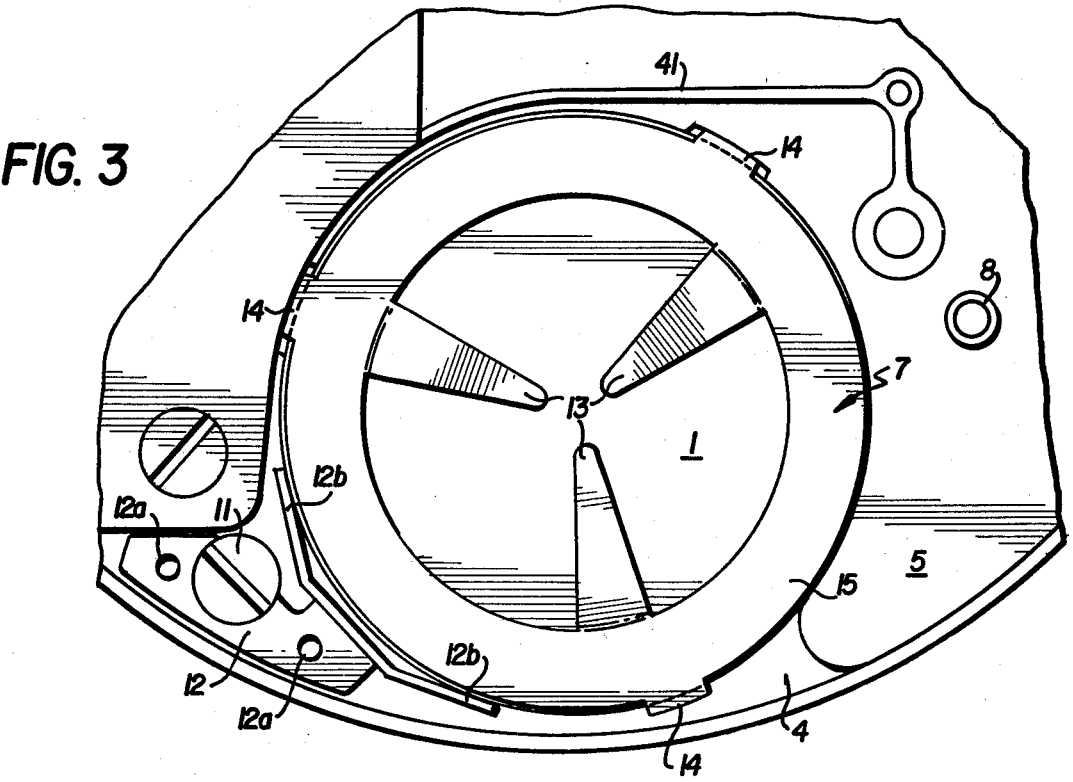
Figure 4:
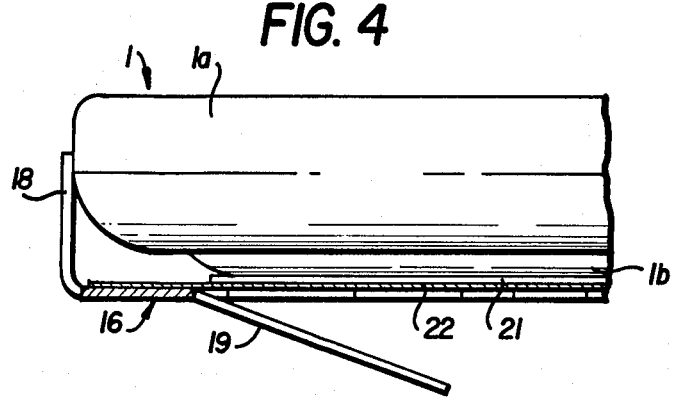
Figure 5:
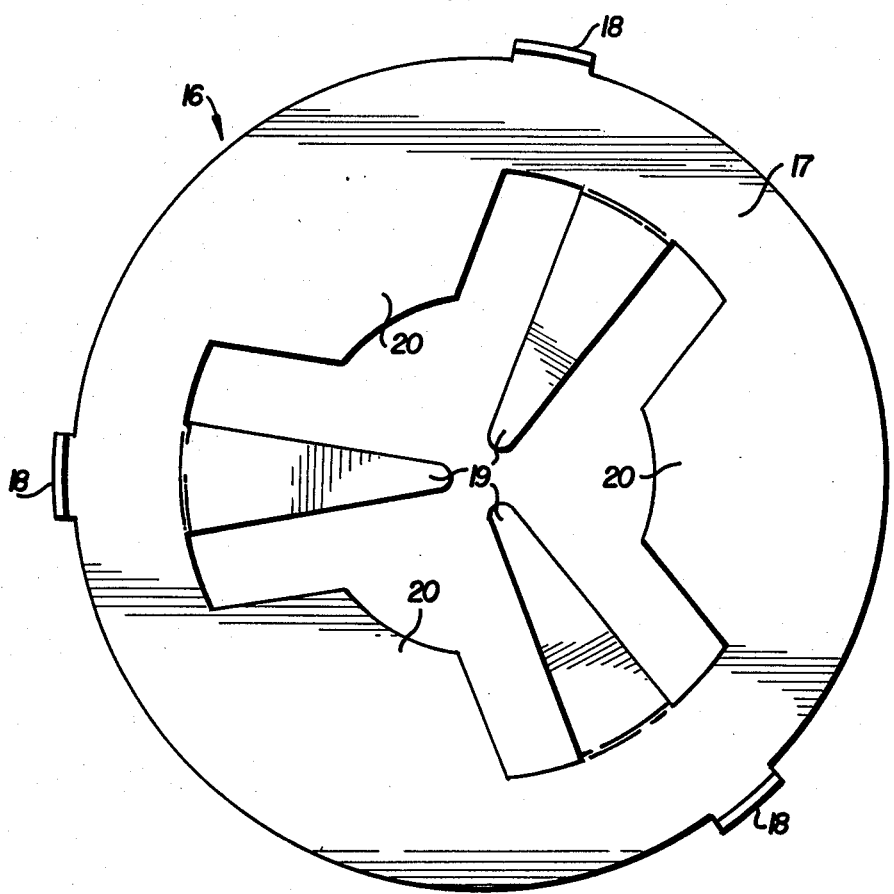

Preferred embodiments and several possible modifications of the invention will now be described in detail with reference to the accompanying drawings, in which:

FIG. 1 is a diagrammatic axial section through an electronic wrist watch equipped with a battery holder according to a first embodiment, FIG. 2 is an axial section on a larger scale, showing details of the battery holder, FIG. 3 is an inverted plan view showing the part of the watch movement visible in FIG. 2, FIGS. 4 and 5 are an axial section and an inverted plan view, respectively, of an axial-pressure bracket forming part of a second embodiment of the invention, and FIGS. 6–10 are inverted plan views of five other modifications of the brackets shown in FIGS. 3 or 5.

FIG. 1 shows how a battery 1 is disposed within an electronic movement 2 in an analog-display quartz wrist watch. Movement 2 is accommodated within a watch case comprising a combined caseband-bezel 3 and closed by a screwed-in back 8. At the back of the movement (FIG. 2) there is a battery recess 4a bounded laterally by the edges of an aperture in a movement plate 4 and by the edge of an indentation in an insulating plate 5 fixed to plate 4.

Insulating plate 5 may, for example, be the substrate of a printed circuit which connects various elements of the watch to an integrated circuit containing the essential active elements of the electronic circuit. Thus, the printed circuit plate 5 may bear leads to be connected to the positive and negative poles of the battery. Conventional batteries are known to comprise an outer casing constituting one electrode, while the other electrode is constituted by a cover having a smaller surface which closes the battery on one of its faces. Between the casing and the cover is a gasket of insulating material, and the assembly as a whole has a generally cylindrical shape. In most cases, the cover is the negative pole, although it is sometimes the positive pole. In the embodiment illustrated in FIG. 2, the cover 1b of battery 1 presses against a spring contact 6 which is connected to plate 5 and insulated from plate 4 by a thin insulating sheet 10, cover 1b also being pressed against a flange 4b of plate 4. The cylindrical portion of the casing 1a of battery 1 is centered by the concave arcuate edge of plate 5 and by another contact part 12, as will be explained below. Finally, a pressure bracket 7, consisting of a single metal part, is disposed between back 8 of the watch case and battery casing 1a. Bracket 7 constitutes the essential part of the battery holder. It is shown in greater detail in FIGS. 2 and 3.

Contact 6 is fixed to insulating plate 5 by a rivet 5a which establishes a connection between contact 6 and a printed conductor 9 borne by plate 5. Insulating sheet 10 is held under flange 4b of plate 4, so that battery 1 can occupy practically the entire thickness of movement 2.

FIG. 3 also shows the manner in which contact is established between the circuit of movement 2 and battery causing 1a by a printed conductor 41 and part 12. Contact part 12 (FIGS. 2 and 3) is formed of a blanked and bent plate which includes a cut-out for a fixing screw 11 entering a hole in plate 4, as well as partially stamped stud-shaped portions 12a which fit into matching holes in plate 4 and thus serve to position part 12 on plate 4. A portion 12b of contact part 12 is bent to form two arms resting against the sidewall of casing 1a. Thus, battery recess 4a is bounded by the edges of the aperture in plate 4, by spring contact 6 which establishes the connection to cover 1b of battery 1, by the edge of plate 5, and by arms 12b of part 12 which embrace the sidewall of battery 1 and hold it in position laterally. The separate part 7 constituting the pressure bracket serves to hold battery 1 in position axially and keeps it from slipping down to back 8 of the watch case in the event of axial shock. A slight displacement of battery 1 might normally be tolerated owing to the resiliency of spring contact 6. However, part 7 is useful in cases where the space between battery 1 and back 8 of the watch case is relatively large so that contact is liable to be broken if battery 1 is displaced. Like part 12, part 7 may be blanked and bent from a metal plate, e.g., a steel or beryllium bronze plate.

In the embodiment illustrated in FIG. 3, bracket part 7 is of a generally circular shape and comprises an annular portion 15 resting against the bottom of battery casing 1a along the periphery thereof. Extending from annular portion 15 are three radial tongues 13 positioned 120° from one another and bent down toward back 8 of the watch case. Furthermore, part 7 is blanked with three radial outer arms which are then bent up at right angles, designated by reference numerals 14. Two of the arms 14 are visible in FIG. 2 and may be seen to extend alongside the sidewall of casing 1a for the greater part of its height.

In a preferred embodiment of the invention, these three side arms 14 will not be disposed at regular intervals but will form differing angles with one another, thus making it possible to adapt a single bracket 7 more easily to different types of watch movements by positioning it differently relative to plate 5. In the embodiment shown in FIG. 3, two of the arms 14 form an angle of 100°, whereas each of these forms an angle of 130° with the third arm 14. It will be understood that other combinations of angular distribution may equally well be selected.

In the embodiment illustrated in FIGS. 2 and 3, bracket 7 is placed on casing 1a after battery 1 has been put in position. This bracket serves only to hold battery 1 in place axially when back 8 is put on, i.e., when the watch case is closed. As the electrical connections are established by parts 6 and 12, movement 2 can be tested prior to casing-up, without its being necessary to make any special connection for that purpose. Since tongues 13 are bent down as shown in FIG. 2, they will be compressed by back 8 in such a way as to take account even of any variations there may be from from one watch case to another as concerns the clearance between the battery and the back. The clearance maintained between the back and the movement makes it possible to equip the movement with either a thick battery or a thin one, as need be, while still using the same bracket 7. Thus, stock-keeping and the supplying of spare parts is greatly simplified by this possibility of increasing efficiency.

As already stated, part 12 is in direct contact with plate 4. It provides the connection between battery casing 1a and the frame of the movement. Hence it is immaterial that bracket 7 also establishes an electrical contact between casing 1a and the watch case since the watch case will be similarly grounded.

In the embodiment illustrated in FIGS. 2 and 3, battery recess 4a is designed for battery cover 1b to face toward the inside of movement 2, i.e., toward the dial side. However, this is not the only arrangement which may be encountered. Certain watch movements are designed in such a way that the casing of the battery faces the inside, while the cover faces the back of the watch case. Such a situation is shown in FIGS. 4 and 5, for example. FIG. 4 shows a battery 1 with its cover 1b facing downward, i.e., toward the back of the watch case, whereas its casing 1a faces toward the inside of the watch movement. A bracket 16 used here is likewise made from a blanked and bent metal plate, but it must be of a slightly different shape. Bracket 16, the shape of which is adaptable to both positions of the battery, comprises an annular portion 16 from which there project three outer radial arms 18 performing the same function as arm 14 in the first embodiment described. Bracket 16 further comprises three resilient radial tongues 19 directed inwardly like tongues 13. Between the tongues 19, annular portion 17 includes flat projections 20. Furthermore, the radius of the inner edge of annular portion 17 will preferably be greater than the radius of battery cover 1b.

A watch movement designed to receive the battery in this position will also comprise a frame as ground. Casing 1a, facing toward the inside when battery 1 is inserted in the movement, is in contact with the plate, which is connected to the frame. Hence it is battery cover 1b which must be connected by insulated connections to the circuit of the movement. For that purpose, a contact strip 21 is disposed in such a way as to lodge in contact with cover 1b and to be attached to the printed circuit without coming in contact with the plate of the movement.

As may be seen in FIG. 4, since bracket 16 is placed beneath contact strip 21, these elements must be insulated from one another. FIG. 4 shows an insulating sheet 22, which may be a thin sheet of plastic, for example, interposed between strip 21 and annular portion 17 of bracket 16. Sheet 22 separates elements 20 from contact strip 21. Instead of using sheet 22, provision might be made to deposit an adherent insulating coating on bracket 16 before or after blanking. This might be done by immersing the bracket in a bath, so that the entire part would then be insulated. Elements 20 provide for the axial-pressure force to be transmitted to battery 1 through strip 21 from the back of the watch case which will be pressing against bent tongues 19. As for arms 18, which are bent axially and are in contact with battery casing 1a, they are obviously electrically connected to tongues 19 and to the back of the watch case; but as already explained, this connection has no unfavorable effect because all these elements are grounded.

In this embodiment, too, arms 18, which are bent axially so as either to grip the battery or simply to hold it, may be angularly spaced from one another at angles other than 120°.

A battery holder comprising a bracket such as bracket 16, shown in FIGS. 4 and 5, will not necessarily include part 12 shown in FIG. 2 because battery casing 1a is grounded via its own bottom surface. Furthermore, strip 21, in contact with cover 1b, is either fixed to the movement by means of a screw so that it can be put in place after the battery has been fitted in the movement, or disposed obliquely so that the battery can be slipped sideways into its recess. In this case, the elements which center the battery in the movement need not be so prominent as in FIG. 2.

Figure 6:
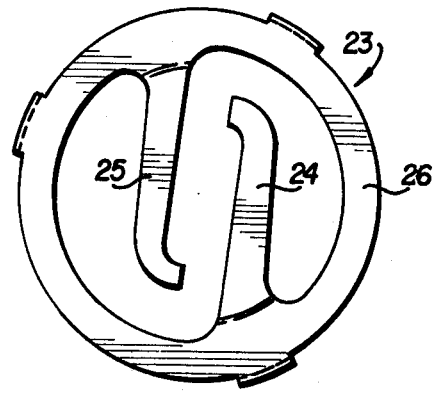
Figure 7:
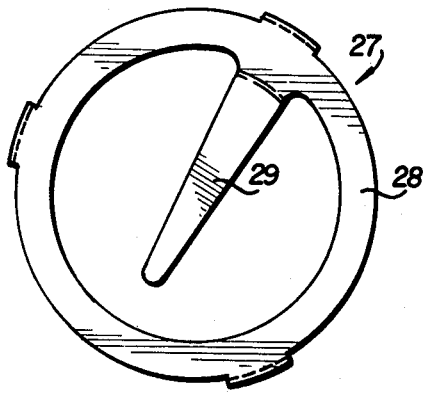
Figure 8:
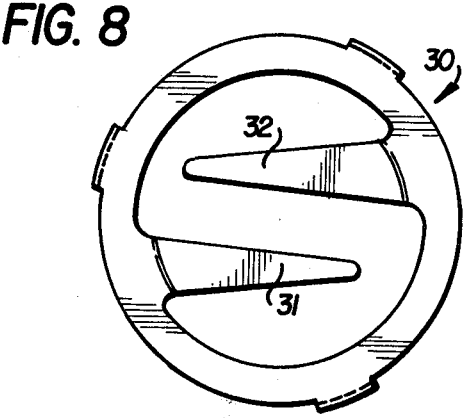
Figure 9:
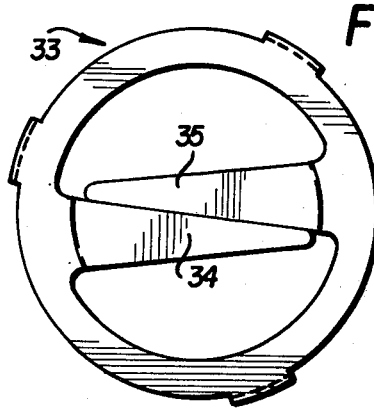
Figure 10:
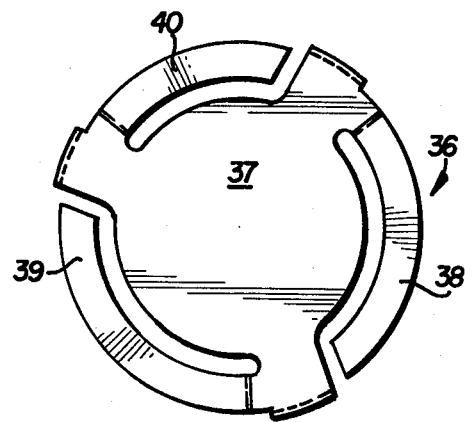

The configurations in which the pressure bracket may be produced are very numerous. FIGS. 6–10 show five modifications of this part. FIG. 6 shows a bracket 23 comprising twin resilient tongues 24 and 25 extending substantially parallel to one another from a circular peripheral rim 26. In FIG. 7, the bottom of a bracket 27 simply comprises an annular portion 28 of uniform width and a bent resilient tongue 29 extending diametrically. In FIG. 8, a bracket 30 comprises two diametrically opposite tongues 31 and 32, whereas in FIG. 9, a bracket 33 likewise comprises two diametrically opposite tongues 34 and 35, but which are adjacent to one another. In order to produce universal brackets standardized solely as a function of the diameter of the battery, it suffices for the designs illustrated in FIGS. 6–9 to provide inner projecting elements such as elements 20 shown in FIG. 5. Finally, FIG. 10 shows as a further modification a bracket 36 suitable for use either with a battery having its cover facing the back of the watch case or with a battery having its cover facing the watch dial. Bracket 36 comprises a substantially circular rigid center portion 37 from which three tongues 38, 39, and 40 project spirally and are bent so as to press against the back of the watch case. The radial arms for gripping the battery are disposed at the bases of tongues 38–40. Such radial arms, bent axially, such as arms 18 in FIG. 5, are obviously provided in each of the modifications illustrated in FIGS. 6–10. If need be, the pressure brackets may be made of plastic material. As it is not indispensable for them to establish an electrical contact, there is no difficulty in producing them in this manner. In cases where the battery cover faces toward the back and the bracket must be insulated, the use of plastic material would be a very simple solution to this insulation problem. However, the tongues would then be less resilient, and the bracket would take up more space.

In the sectional views, such as FIGS. 2 and 4, the bent resilient tongues intended to press against the back of the watch case are shown as rectangular. However, the ends of these tongues may be rounded so as to rest tangentially against the back, which might be an advantage in cases where a screwed-in back is used.

As previously stated, the essential advantage of the battery holder described, and particularly of the use of pressure brackets placed between the battery and the back, is that the same type of brackets can be used for different models of a single caliber having batteries of different thicknesses or even for different calibers. The same bracket adapts to different depths of spacing between the back of the watch case and the battery. This possibility of adaptation can be utilized not only to fit batteries of various thicknesses into a single caliber encased in a single watch case, but also to compensate for possible variations in clearance between the movement and the back deriving from variations in production of the watch cases.

Moreover, in an embodiment as shown in FIGS. 2 and 3 in any case, the use of the pressure bracket facilitates the work of changing the battery, for after having removed in back, it suffices to lift the pressure bracket, and the battery is directly accessible. In prior art devices where a resilient element is used to exert axial pressure on the battery in order to keep it in place, it is necessary to start by taking out a screw in order to remove that element, and this represents an additional complication.

Finally, it has been found that the presence of a metal pressure bracket makes practically no difference in the total thickness of the watch. On the contrary, the use of a battery holder according to the present invention often makes it possible to reduce the overall thickness of the watch since the plate constituting the brackets described may be on the order of 0.12 mm. thick. The tongues may be bent up to 1 mm. out of the principal plane of the bracket in order to allow the insertion of batteries of varying thicknesses, as well as to compensate for tolerances in the dimensions of the backs.

In conclusion, the battery holder described therefore makes it possible to overcome all the drawbacks initially mentioned by means of an extremely simple design. The bracket described may even replace the pressure spring which is often provided when the back of the watch case is equipped with a removable flap covering an opening situated in line with the battery.

What is claimed is:
1. An electronic watch comprising:
   a case body;
   a back removably secured to said case body;
   a watch movement frame part secured within said case body;
   a lodging in said frame part for receiving a battery, the bottom of said lodging being defined by a holding portion integral with said frame part;
   a flat cylindrical battery engaging said lodging and having a sidewall;
   said battery haing a first pole connected to said sidewall;
   a cover connected to a second pole of said battery;
   a flat wall opposed to said cover;
   first and second spring contacts secured with respect to said frame part, said first contact engaging said cover to be in electrical contact with said second pole, said second contact engaging said sidewall to be in electrical contact with said first pole; and a separate bracket means fitted onto said battery and having a resilient protruding tongue which bears against said back, said bracket means pressing said battery against said holding position, whereby said battery is axially held within said watch through said bracket means, which is independent of said spring contacts.

2. A watch according to claim 1 wherein said lodging is further defined by a piece secured to said frame part having a curved edge and by said second spring contact, said second spring contact being substantially diametrically opposed from said piece having a curved edge with respect to said battery.

3. A watch according to claim 1, wherein said bracket means comprises a bracket and insulating means between said bracket and said battery.

4. A watch according to claim 3, further comprising a contact strip disposed between said battery and said bracket means, wherein said insulating means is a sheet separate from said bracket and engaged between said bracket and said contact strip.

5. A watch according to claim 3, wherein said insulating means is a coating applied to a face of said bracket directed toward said battery.

6. A watch according to claim 1, wherein said bracket is a pierced plate having a bent element which forms said tongue and having a pressing element which contacts said battery.

7. A watch according to claim 6, wherein said pierced plate is provided with a plurality of axially bent peripheral arms for gripping said battery.

8. A watch according to claim 7, wherein said arms are irregularly distributed about the periphery of said bracket.

* * * * *